US006287463B1

(12) United States Patent
Ohkawa

(10) Patent No.: US 6,287,463 B1
(45) Date of Patent: Sep. 11, 2001

(54) COLLECTOR CUP

(75) Inventor: Tihiro Ohkawa, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/440,547

(22) Filed: Nov. 15, 1999

(51) Int. Cl.[7] .......................... B01D 35/18; B01D 35/06; B03C 1/00

(52) U.S. Cl. ...................... 210/175; 210/198.1; 210/222; 210/223; 210/243; 209/12.1; 209/127.2; 96/1; 96/2; 96/3

(58) Field of Search ........................ 96/1, 2, 3; 209/12.1, 209/127.2, 227, 722; 210/695, 748, 175, 198.1, 222, 223, 243

(56) References Cited

U.S. PATENT DOCUMENTS 3,722,677 3/1973 Lehnert .
5,218,179 * 6/1993 Matossian et al. ............. 204/298.05
5,827,424 * 10/1998 Gillis et al. .......................... 210/180

FOREIGN PATENT DOCUMENTS

WO 97/34685 9/1997 (WO) .

* cited by examiner

*Primary Examiner*—David A. Reifsnyder
(74) *Attorney, Agent, or Firm*—Nydegger & Associates

(57) ABSTRACT

A collector cup for the collection and removal of the low-mass particles that exit from a plasma mass filter includes a cylindrical shaped wall, an internally cooled. getter plate and a plurality of internally cooled baffles. The baffles are concentrically mounted and are attached to the inside of the cylindrical wall, between the getter plate and the plasma mass filter thereby creating an enclosed volume that is defined by the getter plate, the baffles and the cylinder wall. Entryways are formed between the baffles to allow the gas formed at the baffles to enter the enclosed volume. When the ions and electrons exit from the filter, they collide with the cooler baffles, ano combine to form neutral atoms and vaporize. Once formed, the gas can pass through the entryways and into the enclosed volume where it can be condensed onto the surface of the temperature controlled getter plate. Once condensed onto the surface of the getter plate, the condensed molecules may combine with each other to form larger molecules and solidify. After accumulation, this solid can be periodically removed from the getter plate surface as a liquid by heating the plate to the liquidus temperature of the solid. Additional oxygen or sodium can be introduced into the enclosed volume from a secondary source to combine with any unreacted molecules on the getter plate surface.

20 Claims, 1 Drawing Sheet

COLLECTOR CUP

FIELD OF THE INVENTION

The present invention pertains generally to devices for collecting charged particles as they exit from a plasma mass filter. More particularly, the present invention pertains to devices which can be connected to a plasma mass filter to collect and remove relatively low-mass particles as they exit the filter. The present invention is particularly, but not exclusively, useful for collecting and removing the low-mass particles that exit a plasma mass filter by first condensing the particles and then combining the condensed particles with each other to create a solid or liquid material which can be subsequently removed from the filter.

BACKGROUND OF THE INVENTION

The general principles of operation for a plasma mass filter that is designed to separate low-mass particles from high-mass particles are disclosed in co-pending application Ser. No. 09/192,945 now U.S. Pat. No. 6,096,228 which was filed on Nov. 16, 1998 for an invention entitled "Plasma Mass Filter" and which is assigned to the same assignee as the present invention. In short, a plasma mass filter includes a cylindrical shaped wall which surrounds a hollow chamber. A magnet is mounted on the wall to generate a magnetic field that is aligned substantially parallel to the longitudinal axis of the chamber. Also, an electric field is generated within the chamber which is oriented substantially perpendicular to the magnetic field. Importantly, for operation of a plasma filter, the electric field has a positive potential on the axis relative to the wall which is usually at a zero potential. When a multi-species plasma is injected into the chamber, the plasma interacts with the crossed magnetic and electric fields, resulting in the bulk rotation of the plasma about the chamber axis.

As disclosed in co-pending application entitled "Plasma Mass Filter" and referenced above, the density of the plasma inside the filter is maintained low to avoid particle collisions within the filter. In particular, the plasma density is controlled so that the ratio of each particle's cyclotron frequency ($\Omega$) to the particle's collision frequency ($\nu$) exceeds one ($\Omega/\nu>1$). Specifically, in response to the crossed magnetic and electric fields, each ionized or charged particle in the multi-species plasma will travel on a circular orbit in a plane that is substantially perpendicular to the magnetic field lines. The size of this orbit, or orbit radius, is dependent on the mass to charge ratio of the orbiting particle. Accordingly, the plasma mass filter is designed so that high-mass particles will travel on orbits that are so large that the high-mass particles will strike and be captured by the wall surrounding the chamber. On the other hand, the low-mass particles will have orbits that are smaller than the chamber radius, and hence are confined inside the chamber so as not to strike the chamber walls. Thus, the orbiting low-mass particles drift in the direction of the magnetic field lines, and eventually exit the chamber at one end of the cylinder. The device of the present invention is a collector cup that is designed to collect and remove the low-mass particles that exit from the plasma mass filter.

In light of the above it is an object of the present invention to provide a collector cup which can be positioned in fluid communication with a plasma mass filter for the collection and removal of the low-mass particles that exit from the filter. It is another object of the present invention to provide a collector cup with features that allow for the efficient removal of material that has become deposited on the collector surface. Yet another object of the present invention is to provide a collector cup which is easy to use, relatively simple to manufacture, and comparatively cost effective.

SUMMARY OF THE PREFERRED EMBODIMENTS

A collector cup for the collection and removal of the low-mass particles as they exit a plasma mass filter includes a cylindrical shaped wall. One end of the cylinder wall is open for attachment of the collector cup onto a cylindrical plasma mass filter (described above). The second end of the cylinder wall, opposite the plasma mass filter, is covered by a getter plate. The getter plate contains internal channels that are used to control the temperature of the getter plate surface. When attached to the filter, the collector cup is oriented so that the axis of the cup cylinder is generally parallel to the magnetic field lines that are generated within the plasma mass filter.

For the present invention, a plurality of generally circular, concentric baffles are concentrically mounted to each other and the resultant baffle assembly is attached to the cylinder wall. As so attached, the baffle assembly is positioned in a plane that is perpendicular to the cup axis and parallel to the getter plate. In the preferred embodiment, the baffles of the collector cup are positioned between the getter plate and the plasma mass filter, thereby creating an enclosed volume defined by the getter plate, the baffles and the cylinder wall. In this configuration, the collector cup is effectively positioned outside the plasma filter chamber. Importantly, the baffles contain internal cooling channels which can be used to maintain the baffle temperature below the temperature of the plasma. Also, entryways are formed between the baffles to allow molecules formed at the baffles to enter the enclosed volume of the collector cup from the plasma mass filter side of the baffles.

When the collector cup is attached to the plasma mass filter, and the filter is operated, low-mass ions and electrons drift from the filter and collide with the cooler baffles. Upon their collision with the baffles, the low-mass ions and electrons recombine to form neutral atoms. As the neutral atoms cool in the vicinity of the baffles, they vaporize into gas molecules. About half of the resulting gas that is formed at the baffles passes through the entryways and into the enclosed volume for subsequent collection. On the other hand, the remaining gas molecules that are formed at the baffles will reenter the plasma filter chamber and again dissociate into ions.

Once inside the enclosed volume of the collector cup, the gas molecules can be condensed onto the surface of the temperature controlled getter plate. After condensation onto the getter plate, the condensed molecules may then combine with each other to form larger molecules. For example, oxygen, hydrogen and sodium may condense onto the temperature controlled surface of the getter plate and subsequently combine to form a sodium hydroxide molecule. In the above example, the sodium hydroxide will be formed as a solid. This solid can be allowed to accumulate and to then be periodically removed from the getter plate surface as a liquid. This is done by heating the getter plate to the liquidus temperature of the solid. Finally, provisions are made whereby additional oxygen or sodium can be introduced into the enclosed volume from a secondary source to combine with any unreacted molecules on the getter plate surface.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
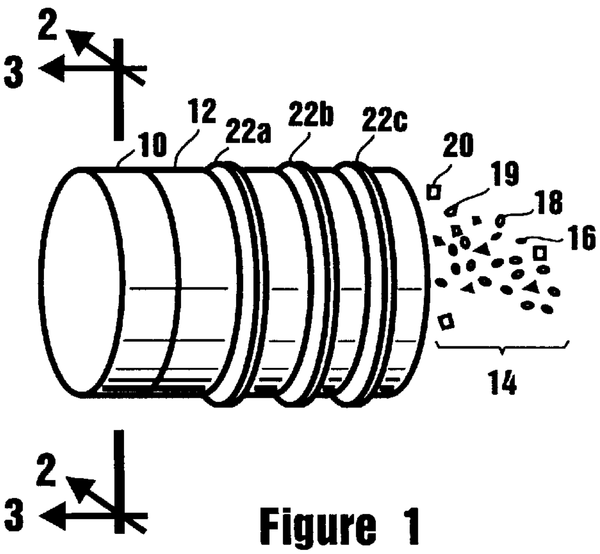
FIG. 1 is a perspective view of the collector cup attached to a plasma mass filter.

Referring to FIG. 1, a collector cup in accordance with the present invention is shown and designated 10. As shown in FIG. 1, the collector cup 10 is attached to a plasma mass filter 12. A suitable plasma mass filter 12 is disclosed in co-pending application Ser. No. 09/192,945 now U.S. Pat. No. 6,096,220 which was filed on Nov. 16, 1998 for an invention entitled "Plasma Mass Filter" and which is assigned to the same assignee as the present invention. FIG. 1 shows a multi-species plasma 14 entering the plasma mass filter 12 for filtration. As shown, the multi-species plasma 14 contains electrons 16, low-mass ions 18, 19 and high-mass ions 20. A magnetic field is created inside the filter 12, by magnetic coils 22*a–c*. Also, an electric field is created inside the filter 12 by an electrode, such as the ring electrodes 21*a–c* shown in FIG. 2.

In response to the magnetic and electric fields inside the filter 12, the high-mass ions 20 are set in orbital motion, and travel in large orbits. As indicated above, the high-mass ions 20 strike the inside wall 23 (see FIG. 2) of the filter 12 and are captured by the filter 12. On the other hand, the low-mass ions 18, 19 and the electrons 16, like the high-mass ions 20, are set in orbital motion by the applied fields, but they travel in small confined orbits within the filter 12. Thus, the low-mass ions 18, 19 and electrons 16 are not captured by the filter 12, but rather, they drift through the filter 12 towards the collector cup 10.

Figure 2:
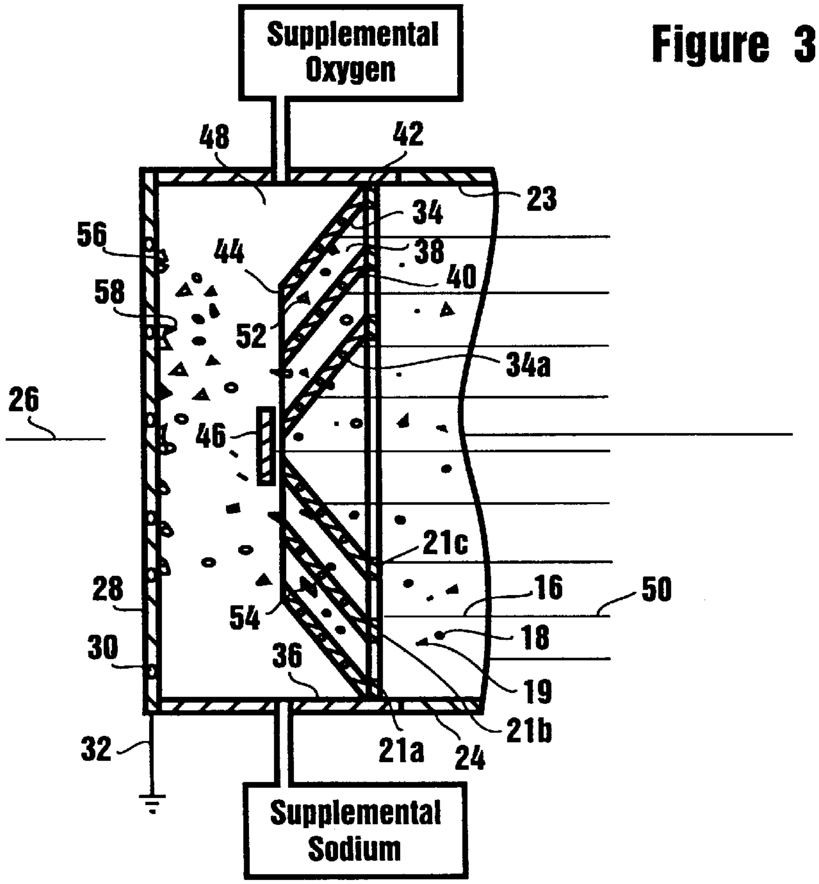
FIG. 2 is an elevational cross section view of the collector cup and a portion of the plasma mass filter as seen along arrow 2—2 in FIG. 1.

As shown in FIG. 2, the collector cup 10 includes a cylindrically shaped wall 24 which defines a longitudinal axis 26. Mounted on one end of the cylinder wall 24 is a getter plate 28. Internal cooling channels 30 are provided to maintain the getter plate 28 temperature as required. Further, the getter plate 28 may be grounded with a grounding wire 32. In the preferred embodiment of the present invention, a plurality of baffles 34 are mounted to each other and the resulting baffle assembly is attached to the inside surface 36 of the cylindrical wall 24. Importantly, the baffles 34 may be composed of a plurality of hollow truncated conical plates. Baffles 34 are distanced from each other to form a plurality of entryways 38 between adjacent baffles 34. In the preferred embodiment, the baffles 34 are all concentric about the longitudinal axis 26 of the cylindrical wall 24. For the purposes of the present invention, the baffles 34 may be made from any high temperature material such as an INCONEL™ alloy, and may be coated with a ceramic. Further, the baffles 34 are formed with internal cooling channels 40. FIG. 2 illustratively shows three hollow truncated conical baffles 34 mounted to each other and attached on the cylindrical wall 24 of the collector cup 10.

As shown in FIG. 2, each conical baffle 34 has a large end 42 and a small end 44. Each end 42,44 forms a circle in a plane perpendicular to the longitudinal axis 26. Importantly, the diameter of the large end 42 of any baffle 34 is larger than the diameter of the small end 44 of any adjacent baffle 34. Thus, with only one exception, an ion 18 traveling on a path parallel to the longitudinal axis 26 will collide with at least one conical baffle 34. The exception, as shown in FIG. 2 occurs within the small end 44 diameter of the center baffle 34*a*. Consequently, to ensure that all ions 18 traveling parallel to longitudinal axis 26 undergo at least one collision as they exit the filter 12, a blocking plate 46 is mounted on the baffles 34 near the small end 44 of the central baffle 34a, as shown in FIG. 2.

In the preferred embodiment, the plurality of baffles 34 are attached to the inside surface 36 of the cylinder wall 24 and are positioned in a plane perpendicular to the longitudinal axis 26 of the collector cup 10 and parallel to the getter plate 28. Further, the baffles 34 are positioned between the getter plate 28 and the plasma mass filter 12, thereby creating an enclosed volume 48 that is defined by the getter plate 28, the baffles 34 and the cylinder wall 24. Importantly, the entryways 38 that are formed between the baffles 34 provide for fluid communication between the enclosed volume 48 and the plasma mass filter 12. In the preferred embodiment, a plurality of ring electrodes 21*a–c* may be formed integral with the baffles 34 to provide the electric field required by the plasma mass filter 12.

As indicated in FIG. 2, the magnetic coils 22 generate magnetic field lines 50 in the plasma mass filter 12 that are aligned parallel to the longitudinal axis 26 of the cylinder wall 24. Importantly, low-mass ions 18, 19 and electrons 16 drift in the direction of the magnetic field lines 50 from the plasma mass filter 12 to the collector cup 10. As the ions 18,19 and electrons 16 drift from the plasma mass filter 12 towards the collector cup 10, they first collide with either the baffles 34 or the blocking plate 46.

Upon collision with either the baffles 34 or the blocking plate 46, the ions 18,19 and electrons 16 recombine forming neutral atoms 52. Further, the neutral atoms 52 generated near the baffles 34 may combine to form gas molecules 54. For example, ion 18 may be a hydrogen ion that exits from the plasma mass filter 12. Upon collision with the internally cooled baffles 34, the hydrogen ion may recombine with an electron 16 forming a hydrogen atom. The heat released due to the recombination may be dissipated by the baffles 34. Subsequently, the hydrogen atom may combine with another hydrogen atom in the vicinity of the baffles 34, to form a hydrogen gas ($H_2$) molecule. The heat associated with the formation of gas molecules 54 may also be dissipated by the baffles 34. About half of the resulting gas molecules 54 formed at the baffles 34 pass through the entryways 38 and into the enclosed volume 48 of the collector cup 10. The remaining gas molecules 54 formed at the baffles 34 reenter the plasma and again dissociate into ions 18,19 and electrons 16.

Other reactions may also take place at the baffles 34. For example, a low-mass ion 19 such as silicon may combine with oxygen at the surface of the baffle 34 forming a solid silicon oxide on the baffle 34. Hence, periodic cleaning of the baffles 34 may be required.

Once inside the enclosed volume 48, the gas molecules 54 can be condensed onto the surface of the temperature controlled getter plate 28. The getter plate 28 temperature required for condensation can be determined after the gas density in the enclosed volume 48 is ascertained. In determining the gas density, it is known that the density of gas molecules 54 in the enclosed volume 48 will be proportional to the density of plasma 14 in the plasma mass filter 12. As disclosed in co-pending application entitled "Plasma Mass Filter" and referenced above, a low density of the plasma 14 is maintained inside the filter 12 in order to avoid particle collisions within the filter 12. In particular, the plasma density is controlled so that the ratio of each particle's cyclotron frequency (Ω) to the particle's collision frequency (ν) exceeds one (Ω/ν>1). At these low plasma densities inside the filter 12, a gas density of about 1 mtorr will be created in the enclosed volume 48. Once the density of gas molecules 54 in the enclosed volume 48 is known, the getter plate temperature required for condensation to occur can be established. For example, sodium vapor at a pressure of 1 mtorr will condense on the surface of the getter plate 28 at temperatures below about 200 degrees Centigrade.

In the preferred embodiment, the internal cooling channels 30 can be used to control the temperature of the getter plate 28 below the condensation point of the gas molecules 54 in the enclosed volume 48. Upon condensation of the gas molecules 54 onto the getter plate 28, the condensed molecules 56 may combine with each other on the surface of the getter plate 28 to form larger molecules 58. For example, oxygen, hydrogen and sodium vapors may condense onto the temperature controlled surface of the getter plate 28 and subsequently combine to form a sodium hydroxide molecule. In the above example, the sodium hydroxide will be deposited on the surface of the getter plate 28 as a solid.

Figure 3:
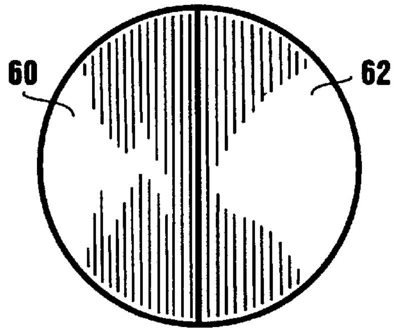
FIG. 3 is an elevation view of the collector cup as seen along arrow 3—3 in FIG. 1, showing the getter plate and its portions.

After allowing the deposited solid to accumulate on the getter plate 28, the solid can be periodically removed from the surface of the getter plate 28 as a liquid, by heating the getter plate 28 to the liquidus temperature of the deposited solid. For deposited sodium hydroxide solids, the getter plate 28 can be heated to a temperature of approximately 350 degrees Centigrade for removal of the sodium hydroxide as a liquid. As shown in FIG. 3, the getter plate 28 can include several portions. FIG. 3 shows two such portions 60, 62. For purposes of the present invention, configuring the getter plate 28 in multiple portions 60, 62 allows the use of one portion as a condensing plate while the other portion is heated for liquification and removal of accumulated solids.

As shown in FIG. 2, additional oxygen or sodium can be introduced into the enclosed volume 48 from a secondary source to combine with any unreacted molecules on the surface of the getter plate 28. For example, each oxygen molecule that condenses on the getter plate 28 from the plasma requires a stoichiometric amount of sodium to form sodium hydroxide. When this required stoichiometric quantity of sodium is not available from the plasma, it can be added to the enclosed volume 48 from a supplemental source, thereby allowing the complete reaction of all of the condensed oxygen into sodium hydroxide.

While the particular Collector Cup as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A cup for collecting particles from a plasma which comprises:

a wall configured to define an axis, said wall having an open first end and an open second end;

a getter plate covering said second end of said wall; and a plurality of baffles, said baffles being positioned at said first end of said wall and centered on said axis to establish an enclosed volume between said wall, said baffles and said getter plate, said baffles being distanced from each other to establish therebetween at least one entryway into said enclosed volume, at least one said baffle being formed with an internal cooling channel, with the particles of the plasma being neutralized and cooled by said baffles before passing through said entryway and through said enclosed chamber for collection on said getter plate.

2. A cup as recited in claim 1 further comprising:

means for selectively cooling at least a portion of said getter plate to a temperature below approximately two hundred degrees Centigrade to combine hydrogen ($H_2$), oxygen ($O_2$) and sodium (Na) thereon; and means for selectively raising at least a portion of said plate to a temperature of approximately three hundred and fifty degrees Centigrade to melt oxygen, hydrogen and sodium combined on said getter plate as sodium hydroxide (NaOH).

3. A cup as recited in claim 2 further comprising:

means for selectively adding additional oxygen to combine with excess sodium to create sodium hydroxide; and means for selectively adding additional sodium to combine with excess oxygen to create sodium hydroxide.

4. A cup as recited in claim 1 wherein said cup is affixed to a plasma chamber, wherein said plasma chamber includes means for creating a magnetic field in said plasma chamber, and wherein said magnetic field has field lines oriented substantially parallel to said axis of said cup to intercept said baffles.

5. A cup as recited in claim 4 wherein particles of the plasma are guided along the magnetic field lines and into collisions with said baffles by the magnetic field.

6. A cup as recited in claim 1 further comprising a blocking plate positioned on said axis in said enclosed volume for causing collisions with particles in the plasma entering said enclosed volume immediately adjacent said axis.

7. A cup as recited in claim 1 wherein each said baffle is shaped as a hollow truncated cone having a first substantially circular edge with a diameter, $D_1$, and having a second substantially circular edge with a diameter, $D_2$.

8. A cup as recited in claim 7 wherein said plurality of baffles are concentric and coplanar, wherein $D_1$ is greater than $D_2$ for each said baffle, and wherein $D_1$ of each said baffle is greater than $D_2$ of any immediately adjacent other said baffle.

9. A cup as recited in claim 7 wherein said first end of said wall interfaces with a plasma chamber and wherein said first edge of each said baffle is a ring electrode for establishing an electric field (E) in said plasma chamber.

10. A cup as recited in claim 6 further comprising a ceramic coating for covering a portion of each said baffle.

11. A cup for collecting particles from a plasma chamber having a substantially uniform magnetic field with substantially parallel magnetic field lines in the chamber, said cup comprising:

a means for neutralizing a portion of the charged particles and electrons from the plasma chamber, said neutralization means positioned to interface with said plasma chamber to intercept said magnetic field lines, said magnetic field lines guiding charged particles in the plasma into collisions with said neutralization means, with the collisions causing the charged particles to recombine with electrons to create atoms, said neutralization means having at least one entryway to allow neutralized atoms to exit from said plasma chamber therethrough; and a collection means, said collection means being cooled relative to said neutralization means and distanced therefrom to establish an enclosed volume therebetween, said collection means being positioned to receive neutralized atoms entering said enclosed volume through said entryway.

12. A cup as recited in claim 11 further comprising a substantially cylindrical shaped wall defining an axis, said wall having a first end and a second end, and wherein said neutralization means comprises a plurality of baffles positioned at said first end of said wall and centered on said axis, said baffles being distanced from each other to establish at least one said entryway therebetween into said enclosed volume, and further wherein said collection means is a getter plate positioned at said second end of said wall to establish an enclosed volume between said wall, said baffles and said getter plate.

13. A cup as recited in claim 12 further comprising a blocking plate positioned on said axis for causing collisions with particles in the plasma entering said enclosed volume substantially adjacent said axis.

14. A cup as recited in claim 12 wherein each said baffle is shaped as a hollow truncated cone having a first substantially circular edge with a diameter, $D_1$, and having a second substantially circular edge with a diameter, $D_2$, and wherein said plurality of baffles are concentric and coplanar, wherein $D_1$ is greater than $D_2$ for each said baffle, and wherein $D_1$ of each said baffle is greater than $D_2$ of any immediately adjacent other said baffle.

15. A cup as recited in claim 14 wherein said first edge of each said baffle is a ring electrode for establishing an electric field (E) in said plasma chamber.

16. A cup as recited in claim 12 further comprising means for selectively maintaining at least a portion of said getter plate at a temperature below two hundred degrees Centigrade and means for periodically raising at least a portion of said plate to a temperature of approximately three hundred and fifty degrees Centigrade.

17. A cup for collecting particles from a plasma which comprises:

a wall configured to define an axis, said wall having an open first end and an open second end;

a getter plate covering said second end of said wall, said getter plate formed with at least one internal cooling channel to control the temperature of said getter plate; and a plurality of baffles, said baffles being positioned at said first end of said wall and centered on said axis to establish an enclosed volume between said wall, said baffles and said getter plate, said baffles being distanced from each other to establish therebetween at least one entryway into said enclosed volume, said baffles for neutralizing and cooling said particles before said particles are collected on said getter plate.

18. A cup as recited in claim 17 wherein said plasma includes oxygen and sodium and said cup further comprises:

means for selectively adding additional oxygen to combine with excess sodium to create sodium hydroxide; and means for selectively adding additional sodium to combine with excess oxygen to create sodium hydroxide.

19. A cup as recited in claim 17 further comprising a blocking plate positioned on said axis in said enclosed volume for causing collisions with particles in the plasma entering said enclosed volume immediately adjacent said axis.

20. A cup as recited in claim 17 wherein said first end of said wall interfaces with a plasma chamber and wherein at least one baffle is formed with a first edge that is a ring electrode for establishing an electric field (E) in said plasma chamber.

* * * * *